United States Patent [19]
Stephenson

[11] 3,780,449
[45] Dec. 25, 1973

[54] RESEARCH TEACHING TOOL

[76] Inventor: John Edward Stephenson, 893 Kennedy Rd., Toronto, Ontario, Canada

[22] Filed: May 1, 1972

[21] Appl. No.: 248,924

[52] U.S. Cl. .......................................... 35/1, 35/73
[51] Int. Cl. ................................................ G09b 1/02
[58] Field of Search .................. 35/22 R, 8 R, 73, 35/1, 72; 273/1 R, 157 R, 157 A

[56] References Cited
UNITED STATES PATENTS
267,402  11/1882  Bynon ............................ 35/72
994,227  6/1911  Whitelaw ...................... 273/157 R Primary Examiner—Wm. H. Grieb
Attorney—Kerry Maxwell Hill

[57] ABSTRACT

The following specification discloses a novel teaching device and research tool made in the shape of a ball and composed of a plurality of segments interfitted like the segments of a citrus fruit and spaced apart from a hollow cylindrical core. The segments are made from polyurathane foam, covered with fabric and detachably fitted to one another and to the cylinder. Base and cover members are provided to complete the ball-like appearance of the device.

2 Claims, 5 Drawing Figures

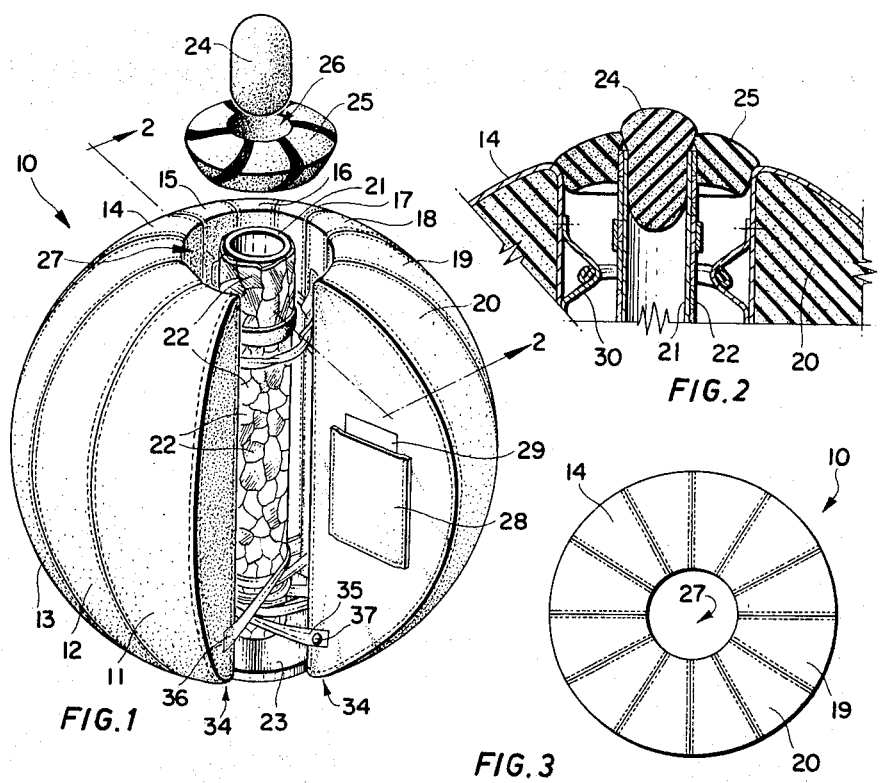
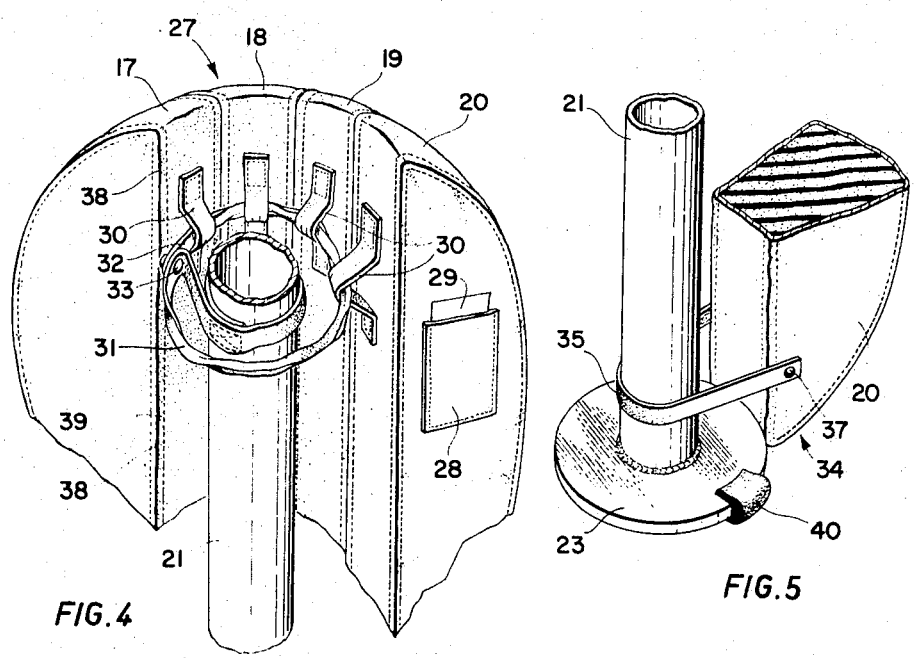

RESEARCH TEACHING TOOL

The present invention relates to a means for attracting and maintaining the attention of small children for the purpose of demonstrating a lesson during a teaching period or the like. In particular the device, to be described hereinafter, allows for the active participation of a child or children during the device's use as a teaching aid thereby providing a neutral ground between child and teacher to promote trust and mutual interest therebetween.

It is an object of the invention to construct a teaching aid that is above all things, fun for children to use, and which is attractive to all their senses. It has bright shiny parts and also has parts that are colourful, thereby appealing to the eye. It has smooth surfaces and soft surfaces, thereby appealing to their touch. It can be wired for sound but, in the device as shown, in the teacher's voice is relied upon for oral appeal. The parts can also be tainted with odors that are appealing. Most importantly, by being easily taken apart, and by having hidden repositories for written messages and pictures, the device appeals to a child's imagination and sense of discovery.

It is known that different children respond to different methods of teaching. Some respond best to pictorial information, while others respond best to oral and audio information, while others respond best when their tactile senses are used or when they physically must be stimulated. In modern schools, teachers use many devices to stimulate and maintain attention. The chalk and blackboard method of recording and repeating, orally delivered information, is one of our best and most widely used teaching devices but many other classroom devices are being used such as movies, slides, counting sticks and blocks, and recordings. It has been found that projects where groups of children work with material together and thereby stimulate one another and which becomes fun give results that greatly extend their attention span, and thereby assist the teacher to put across the lesson.

It is the principal object of the present invention to provide a teaching device having a central hollow cylindrical core for holding a hidden rolled lesson in pictorial or written form and surrounded by a series of segments like the segments of an orange, to form a ball-like structure. The core is fixed to a base member and each segment is detachably fastened to the cylindrical core. The segments are each made of polyurethane foam and are covered by a different colour of terry cloth. Each segment, being of a particularly distinct colour is identified with a different child in a group as considered 'his' segment. It has a pocket in it where the teacher may place a lesson, task or puzzle for that child. He may when permitted take the segment from the common ball of segments and use it as a cushion or pillow at the appropriate time after searching in the pocket for 'his' message. When the segments are removed the central core reveals a mirror surface to hold the children's attention for the next stage of the lesson, namely, the removal of the hidden message, picture, or other surprise that is held in the hollow centre of the core.

The features of the invention are more particularly and specifically described with references to the accompanying drawing in which;

FIG. 1 is a perspective view of the invention shown with the top lifted off and two of the segments removed to reveal the core.

FIG. 2 is a sectional view taken along the line 2—2 of FIG. 1.

FIG. 3 is a top view of the device with all segments in place.

FIG. 4 shows the method of attaching the segments together and to the core.

FIG. 5 shows the method of attaching the bottom of each segment of the core.

In FIG. 1, numeral 10 designates the ball-shaped device of the invention composed of terry cloth covered segments of polyurethane, 11, 12, 13, 14, 15, 16, 17, 18, 19 and 20 attached to a cylindrical core member 21 having mirror sections 22, covering its outer surface. Cylinder 21 is attached to a base 23 and has a foam rubber stopper 24 insertable in its upper side to provide a soft upper end to the ball 10. Another foam member 25 with an opening 26 is fitted over the cylinder to fill the space 27 created when the segments are pressed together but spaced apart from the core 21 to base 23. The base can be made of soft wood such as balsa or be covered by a soft material to insure that the ball 10 with all the segments and stopper and foam washer 25 interfitted together forms a soft toy-like object that can be played with, without the possibility of a child injuring himself on any sharp projections.

Segment 20 shows a pocket 28 stitched to its inner side and thereby adapted to conceal a message 29 until the segment 20 is withdrawn from the ball of segments 10.

An elasticized strap 30 is attached to the upper side of each segment as shown in FIG. 4 and an elasticized band 31 is attached at one end 32, to the cylinder 21 as shown and holds together the segments by passing thru each of the straps 30 of each segment in succession and has its free end 32 fastened by a dome fastener 33 to the portion of the band 31 surrounding and attached to the cylinder core 21. During storage in the classroom or for conveyance from place to place or for use during play as a ball toy the segments are bound together by the band 31 and dome fastened as at 33.

The foot 34 of each segment is spaced apart from the cylinder 21 by the base member 23 but held there and to the cylinder 21 by an elasticized strap 35. Each of the straps 35 is fastened by sticking 36 to one side of its related segment and dome fastened to the other of its sides by dome fastener 37.

Each of the segments of the ball is coloured differently and each child is given a colour to be 'his' and to hold and contain 'his' particular lesson. An additional pocket (not shown) can be made into the interior of the segment along an edge 38 to hold additional hidden pictorial or written messages or lessons for each child.

A teacher first introduces the ball into a group of children in its assembled condition with plug stopper 24 and spacer 25 and all segments in place and strapped in position. The children may touch and play with the assembled ball seeking out their own colour. The hollow cylinder 21 may contain a sheet or scroll with material for the day's lesson. After removing the plugs the teacher may have a child lift out the sheet from the interior of the cylinder after the group has settled around the ball. In due time and after showing and telling the material from within the cylinder to all the group the teacher unfastens the strap 31 and alows each child in turn or together to pull out the upper side of his own colour of segment and withdraw from the pocket or pockets the problem or message placed there for him. After each child has answered his question as posed by the pocket message he may be allowed to unfasten the lower dome of the strap of his segment and take the segment with him as a cushion during story time or as a pillow during rest time. The cylinder itself remains in the centre of the group at all times to be the centre of interest and provides by its mirror faces as in FIG. 1, or by its chrome mirror surface as in FIG. 3 and 4, a place where the children can see their reflection. An absent child's segment will hide a portion of the mirror surface.

The device can be used in many ways to keep the children's interest and stimulate their imagination. By identifying each child with a coloured segment an extension of himself is achieved where he can see himself in the group and with the group helping him thereby to integrate with the group.

The pillows or segments can be covered with different types of fabrics and different types of weaves, rather than all of terry cloth, thereby providing greater variety to both the visual and tactile stimulation of the children. For example segment 12 could be silk covered and segment 20 could be sack-cloth covered. To insure the safety of the closure means for each segment, a "Velcro" type closure 39, is used along edge 38 of each segment.

Should it be necessary to make the base of a hard wood or to construct the base 23 integrally with the cylinder 21 or to weld them together, a rubber grommet 40 (shown in section) can be interfitted around the outer edge of base 23 to insure that no child will be injured by coming into contact with the hard base.

It will be appreciated by those skilled in the teaching arts, that the present device lends itself particularly well to being a research tool. Should a teacher wish to measure children's responses to specific and different stimuli in a laboratory-like situation the present invention will be found to be of particular use and to provide novel results. It can therefore be used as a research tool. Other uses as a teaching aid, toy or research tool will be obvious to those skilled in the art and such uses are covered by the accompanying claims.

I claim:

1. A research tool for use in measuring the attention and response of individual persons in a group under instruction and observation comprising in combination;
    a core member of rigid construction having an opening for hiding lesson material therein;
    a plurality of segment members, each formed from a yieldable material covered with a washable fabric, said segment members abuttable one with another to form a ball-like structure surrounding said core;
    and means detachably maintaining said core and said segment members together as a ball.

2. A research tool as claimed in claim 1, wherein said core member is of cylinder shape and is fixed to base means;
    and wherein each segment member has a pocket means formed in that part of its fabric covering to be revealed only by the removal from the ball-like structure, of an abutting segment.

* * * * *